United States Patent
Hirano

(10) Patent No.: US 9,921,995 B2
(45) Date of Patent: Mar. 20, 2018

(54) MANAGING DATA IN USB COMMUNICATION

(71) Applicant: CANON KABUSHIKI KAISHA, Tokyo (JP)

(72) Inventor: Yasuhiko Hirano, Moriya (JP)

(73) Assignee: Canon Kabushiki Kaisha, Tokyo (JP)

( * ) Notice: Subject to any disclaimer, the term of this patent is extended or adjusted under 35 U.S.C. 154(b) by 176 days.

(21) Appl. No.: 14/847,473

(22) Filed: Sep. 8, 2015

(65) Prior Publication Data

US 2016/0092394 A1    Mar. 31, 2016

(30) Foreign Application Priority Data

Sep. 26, 2014 (JP) .................................. 2014-197339

(51) Int. Cl.
| | |
|---|---|
| G06F 13/00 | (2006.01) |
| G06F 13/38 | (2006.01) |
| G06F 13/40 | (2006.01) |
| G06F 13/42 | (2006.01) |
| G06F 9/445 | (2018.01) |
| G06F 13/16 | (2006.01) |

(52) U.S. Cl.
CPC ...... *G06F 13/4282* (2013.01); *G06F 9/44505* (2013.01); *G06F 13/1668* (2013.01); *G06F 13/426* (2013.01); *G06F 2213/0042* (2013.01)

(58) Field of Classification Search
None
See application file for complete search history.

(56) References Cited

U.S. PATENT DOCUMENTS

| | | | |
|---|---|---|---|
| 6,389,029 B1* | 5/2002 | McAlear | H04L 12/46 370/402 |
| 6,959,350 B1 | 10/2005 | Luke et al. | |
| 7,761,620 B2 | 7/2010 | Iwata | |
| 2002/0078283 A1* | 6/2002 | Purcell | G06F 13/426 710/109 |
| 2008/0010389 A1 | 1/2008 | Iwata | |
| 2008/0201498 A1* | 8/2008 | Ohkubo | G06F 13/385 710/33 |

FOREIGN PATENT DOCUMENTS

| | | |
|---|---|---|
| CN | 1950811 A | 4/2007 |
| JP | 2008-015823 A | 1/2008 |

OTHER PUBLICATIONS

"Universal Serial Bus Specification", XP002497629, Revision 1.1, Compaq Intel Microsoft Nec, Sep. 23, 1998.
European Search Report dated Dec. 21, 2015 in European Application No. 15002690.4.
Chinese Office Action issued in corresponding Chinese Application No. 201510616852.8 dated Jan. 11, 2018.

* cited by examiner

*Primary Examiner* — David E Martinez
(74) *Attorney, Agent, or Firm* — Fitzpatrick, Cella, Harper & Scinto

(57) ABSTRACT

In a case where a changeover request indicating to change over setting of an end point is received from an external apparatus, an information processing apparatus decides whether or not data is being transferred from the end point to a memory of the information processing apparatus. Then, in a case where it is decided that the data is being transferred from the end point to the memory, the information processing apparatus does not change over the setting of the end point.

6 Claims, 5 Drawing Sheets

TIME

MANAGING DATA IN USB COMMUNICATION

BACKGROUND OF THE INVENTION

Field of the Invention

The present invention relates to an information processing apparatus which prevents that data received from a USB (universal serial bus) host is lost, a controlling method for the information processing apparatus, and a storage medium for storing therein a computer program to achieve the controlling method.

Description of the Related Art

In general, a host apparatus such as a PC (personal computer) or the like and peripherals such as an MFP (multifunction peripheral), a printer and the like are mutually connected via various I/F's (interfaces) to perform data communication of print data and the like. For example, a USB has widely been used as one of the various I/F's.

In the USB standard, to use a common driver for each application, a USB device class specification has been defined in correspondence with a kind of peripheral (USB Function). Also, in a printer class specification, necessary transfer modes and the number of End Points serving as transmission/reception buffers have been defined. Thus, a USB printer class driver can be used based on this specification.

The print data from the PC is transferred to the MFP by data transfer called a Bulk Out from a USB host to the direction of the USB Function.

In the MFP, the data stored in the End Point serving as the transmission/reception buffer is transferred to a RAM (random access memory) serving as an internal data storage area by using a DMAC (dynamic memory access controller).

In the USB standard, the high-speed USB 3.0 (maximum data communication speed is 5 Gbps) has been put to practical use. For this reason, there is a problem that more data cannot be received in the state that the End Points serving as the transmission/reception buffers have been filled with the data.

In this connection, Japanese Patent Application Laid-Open No. 2008-15823 discloses the technique of changing the size of a transmission/reception buffer in response to an instruction from a USB host.

SUMMARY OF THE INVENTION

The USB Function, for which an alternate (or substitute) setting called an Alternate Setting has been defined, can have a plurality of settings of the End Point serving as the transmission/reception buffer. However, if the setting of the End Point is changed over, the data which has been stored in the End Point is lost.

Therefore, in the present invention, there is provided an information processing apparatus which is communicable with an external apparatus via a USB cable, and comprises: a memory; a transferring unit configured to transfer data stored in an end point, from the end point to the memory; a deciding unit configured to decide whether or not the data is being transferred from the end point to the memory, in a case where a changeover request indicating to change over setting of the end point is received from the external apparatus; and a controlling unit configured to change over the setting of the end point according to the changeover request in a case where it is decided by the deciding unit that the data is not being transferred from the end point to the memory, and not to change over the setting of the end point in a case where it is decided by the deciding unit that the data is being transferred from the end point to the memory.

Further features of the present invention will become apparent from the following description of exemplary embodiments with reference to the attached drawings.

DESCRIPTION OF THE EMBODIMENTS

Hereinafter, preferred embodiments of the present invention will now be described in detail in accordance with the accompanying drawings.

First Embodiment

Figure 1:
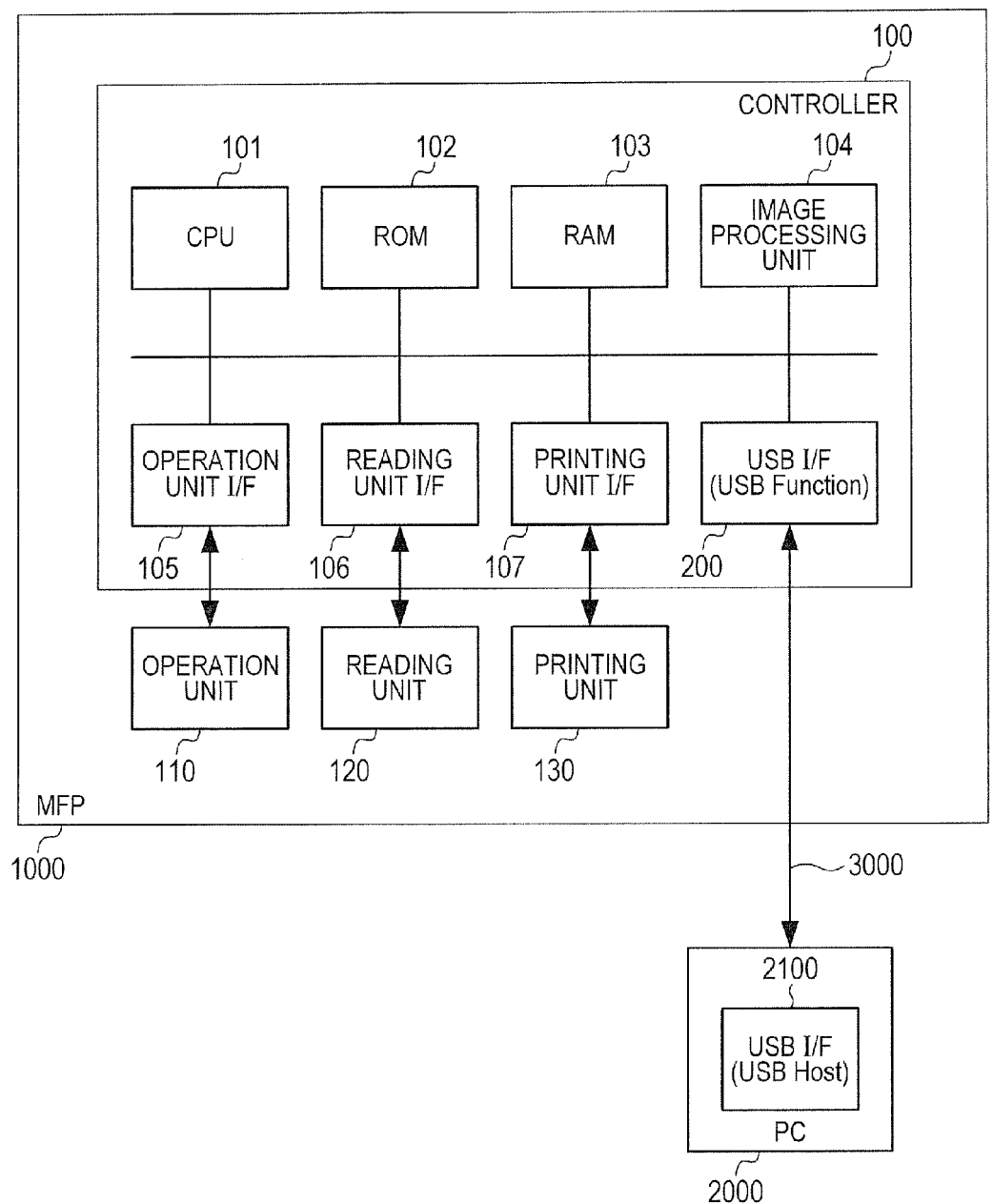
FIG. 1 is a block diagram mainly illustrating an example of a hardware constitution of an MFP.

FIG. 1 is a block diagram illustrating an example of a system configuration of an image forming system and an example of a hardware constitution of an MFP.

The image forming system comprises an MFP 1000 and a PC 2000, as the system configuration.

In the image forming system, the MFP 1000 and the PC 2000 are connected to each other via a SUB cable 3000. Here, the MFP 1000 is an example of an information processing apparatus which serves as a USB Function, and the PC 2000 is an example of an external apparatus which serves as a USB Host.

The MFP 1000 comprises a controller 100, an operation unit 110, a reading unit 120, and a printing unit 130. The MFP 1000 serves as a printing apparatus which can perform printing.

The controller 100 controls the USB communication to be performed by the MFP 1000, and wholly controls the functional blocks of the MFP. The controller 100 comprises a CPU (central processing unit) 101, a ROM (read only memory) 102, a RAM (random access memory) 103, an image processing unit 104, an operation unit I/F 105, a reading unit I/F 106, a printing unit I/F 107, and a USB I/F (USB Function) 200.

The CPU 101 controls each functional block in the controller 100. The ROM 102 stores therein the control programs of the controller 100. The RAM 103 serves as a control program execution area of the controller 100, a working data area for image processes, and a data storage area. The image processing unit 104 performs the image process of the controller 100. The operation unit I/F 105 controls the I/F between the controller and the operation unit 110. The reading unit I/F 106 controls the I/F between the controller and the reading unit 120. The printing unit I/F 107 controls the I/F between the controller and the printing unit 130. The USB I/F 200 controls the USB communication with the PC 2000.

On the premise that the CPU 101 performs the processes based on the programs stored in the ROM 102 and the like, the later-described functions of the MFP 1000, the process of the MFP in the later-described sequence diagram, and the process in the later-described flow chart are achieved. Incidentally, the RAM 103 is an example of an internal memory.

The PC 2000 comprises a USB I/F (USB Host) 2100. The USB I/F 2100 controls the USB communication with the MFP 1000.

Moreover, the PC 2000 has at least a CPU, and memories such as a RAM, a ROM and the like as the hardware constitution. Thus, on the premise that the CPU of the PC 2000 performs the processes based on the programs stored in the memory of the PC 2000, the later-described functions of the PC 2000, and the process of the PC in the later-described sequence diagram are achieved.

Figure 2A:
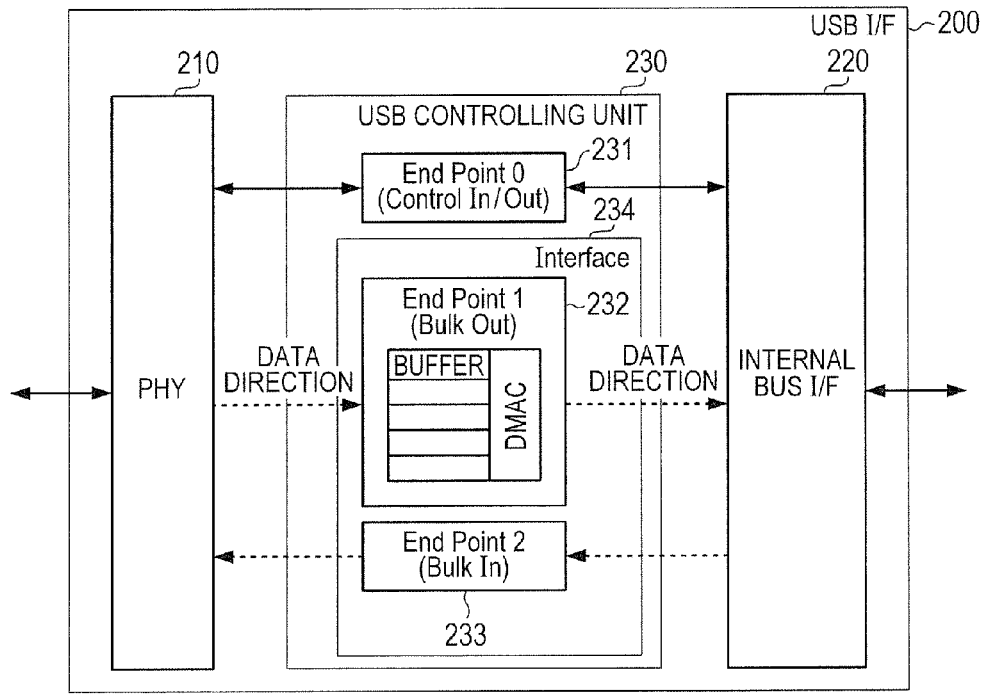
FIGS. 2A and 2B are diagrams each illustrating an example of an internal hardware constitution of a USB I/F.
Figure 2B:
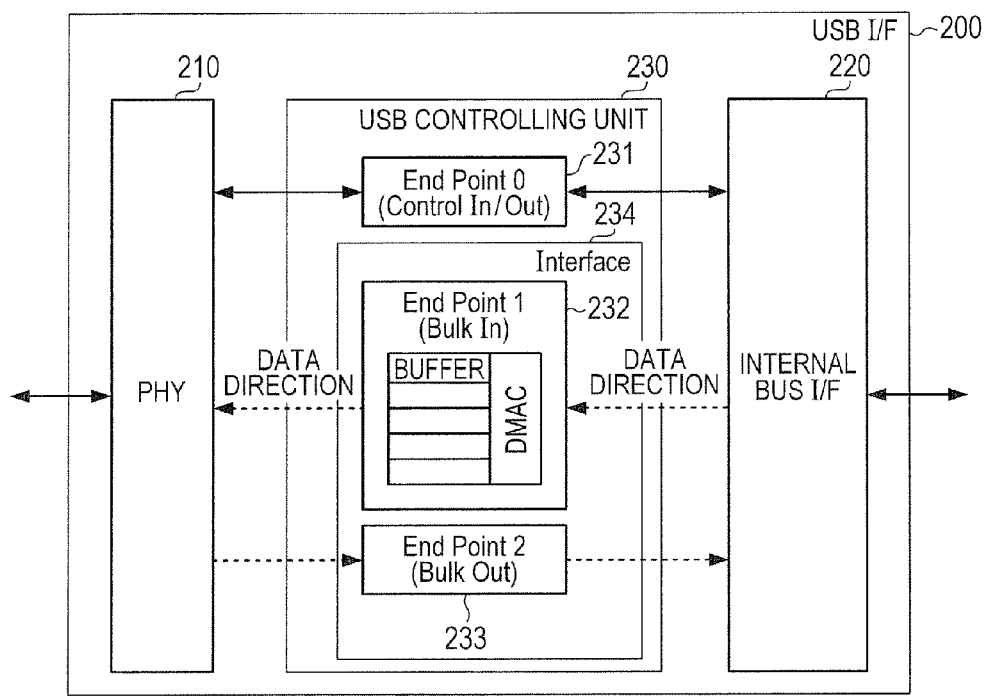

FIGS. 2A and 2B are diagrams each illustrating an example of the internal hardware constitution of the USB I/F 200.

As illustrated in each of FIGS. 2A and 2B, the USB I/F 200 comprises a PHY (physical layer circuit) 210, an internal bus I/F 220, and a USB controlling unit 230.

The PHY 210 performs the USB communication.

The USB controlling unit 230 controls the USB communication and data transfer to the RAM 103.

The internal bus I/F 220 is the internal data path provided in the USB I/F 200, and the USB controlling unit 230 comprises an End Point 0 231 and an Interface 234.

The End Point 0 231 transfers control data.

The Interface 234 comprises an End Point 1 232, and an End Point 2 233. Each of the End Point 1 232 and the End Point 2 233 is an example of a buffer.

Since an alternate setting called an Alternate Setting has been defined for the USB Function, the USB Function can have a plurality of settings for the End Point serving as a transmission/reception buffer.

In FIGS. 2A and 2B, the settings of the End Point 1 and the End Point 2 are respectively different.

In FIG. 2A, the End Point 1 has the setting of Bulk Out, and performs the data transfer from the USB Host to the direction of the USB Function.

On the other hand, in FIG. 2B, the End Point 1 has the setting of Bulk In, and performs the data transfer from the USB Function to the direction of the USB Host.

Likewise, in FIG. 2A, the End Point 2 has the setting of Bulk In, and performs the data transfer from the USB Function to the direction of the USB Host.

On the hand, in FIG. 2B, the End Point 2 has the setting of Bulk Out, and performs the data transfer from the USB Host to the USB Function.

Subsequently, a transferring operation of print data from the PC will be described along a time axis with reference to FIGS. 3A to 3D.

The setting of the MFP 1000 corresponds to that shown in FIG. 2A. That is, the print data to be transferred from the PC is stored in the buffer of the End Point 1 set to the Bulk Out, and further transferred to the RAM 103 by the DMAC.

The End Point 1 232 performs the data transfer from the USB Host called the Bulk Out to the direction of the USB Function.

The End Point 1 comprises a buffer for temporarily storing the transfer data on the USB, and the DMAC for performing the data transfer to the RAM 103.

The End Point 2 233 performs the data transfer from the USB Function called the Bulk In to the direction of the USB Host.

Figure 3A:
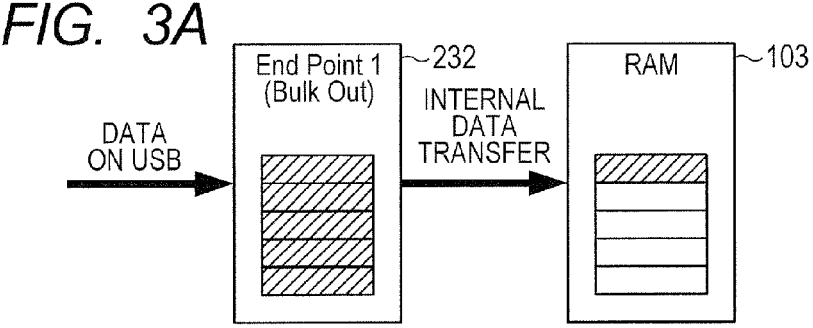
FIGS. 3A, 3B, 3C and 3D are diagrams for describing a transferring operation of print data from a PC along a time axis.

In FIG. 3A, the print data are stored in all the buffers of the End Point 1. In this case, the USB Function sends a response indicating that data is not acceptable (i.e., a retransmission request after a certain interval) to the USB Host.

Figure 3B:
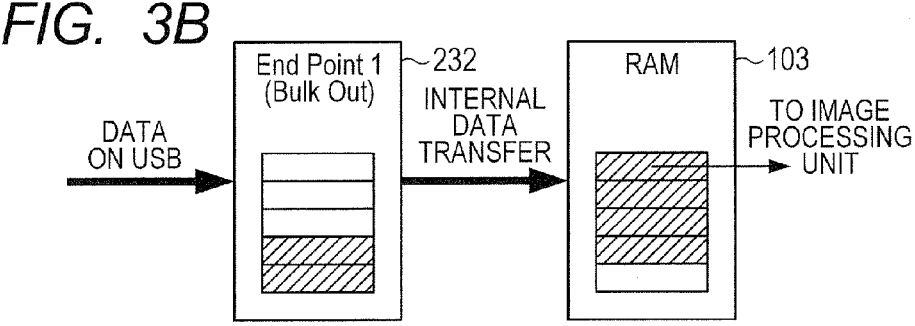
Figure 3C:
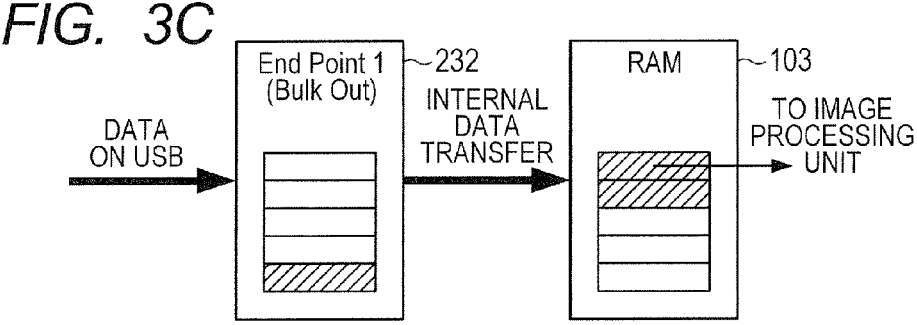

In FIGS. 3B and 3C, it can be understood, by the data transfer from the RAM 103 to the next image processing unit 104, that the data in the buffers of the End Point 1 and the RAM 103 reduce.

Figure 3D:
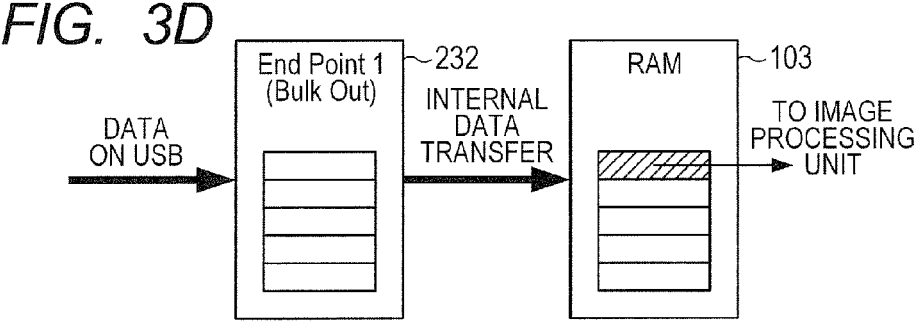

In FIG. 3D, it can be understood that there is no data in the buffers of the End Point 1, and the data still remains in the RAM 103.

Subsequently, operations in the whole system including the PC (USB Host) and the MFP (USB Function) will be described with reference to FIG. 4.

Figure 4:
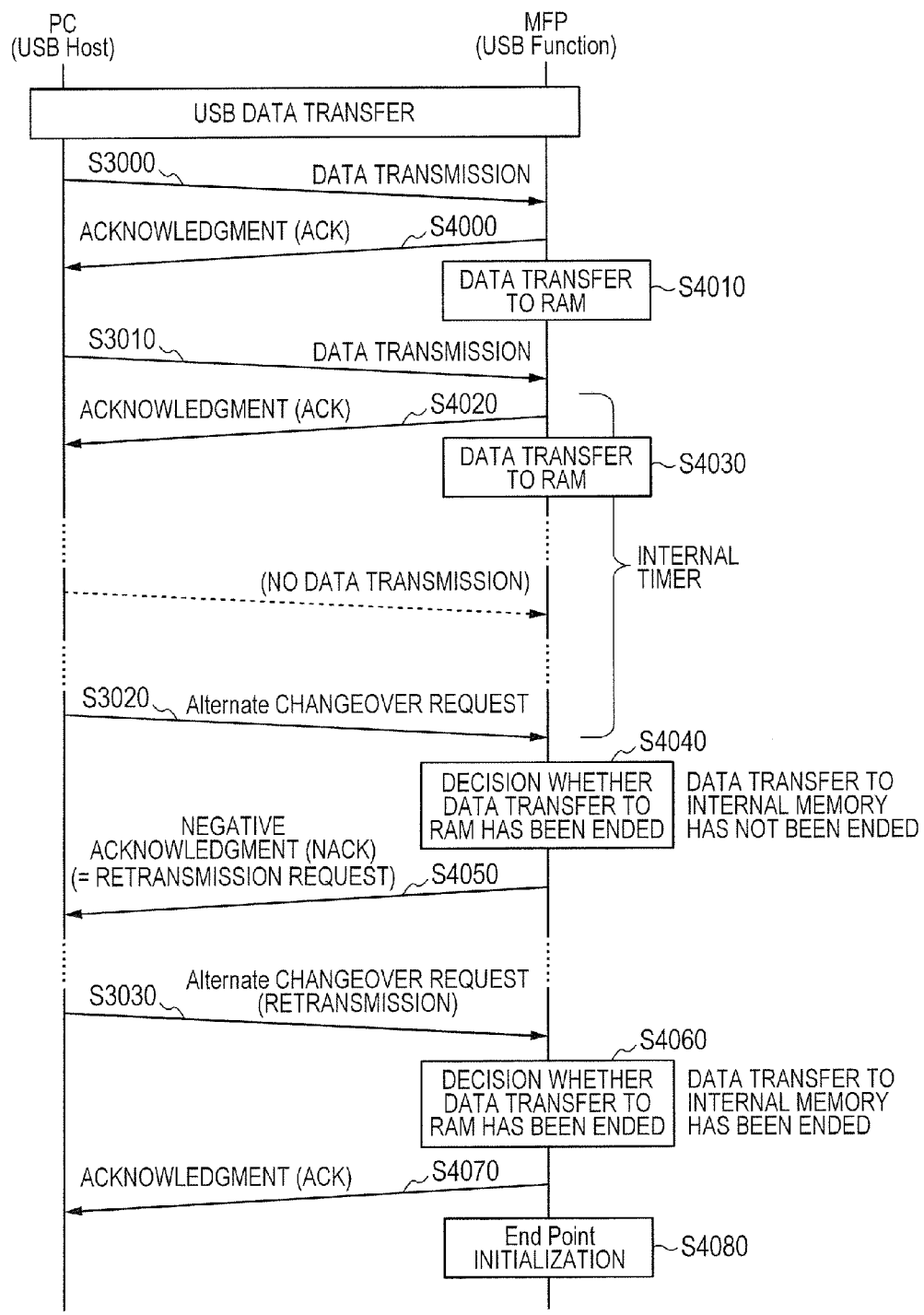
FIG. 4 is a sequence diagram for describing an example of an information process by the PC and the MFP.

That is, FIG. 4 is the sequence diagram for describing an example of the information process by the PC and the MFP along with a time axis.

In FIG. 4, it is assumed that time advances downward along the vertical axis. On this assumption, the operation to be performed by the PC 2000 is shown on the left, and the operation to be performed by the MFP 1000 is shown on the right.

The USB data transfer is performed by the following procedure.

In S3000, the PC 2000 transmits data.

In S4000, when the data is receivable, that is, when there is an empty buffer in the End Point 1, the MFP 1000 returns an ACK (ACKnoweledge) to the PC. Here, the ACK is an example of an ACK response.

In S4010, the MFP 1000 transfers the received data to the RAM 103 serving as a data storage area.

In S3010, the PC 2000 transmits next data.

In S4020, when the data is receivable, that is, when there is still an empty buffer in the End Point 1, the MFP 1000 returns the ACK to the PC.

In S4030, the MFP 1000 transfers the received data to the RAM 103 serving as the data storage area.

Here, when the data is received from the PC 2000, the MFP 1000 starts an internal timer for which time has previously been set. More specifically, the internal timer is restarted when the next data is received from the PC 2000.

The above operation processes are repeated by the PC 2000 and the MFP 1000 until data to be transmitted becomes zero.

Next, in S3020, the PC 2000 transmits an Alternate changeover request for changing over the setting of the End Point.

In S4040, the MFP 1000 decides whether or not the data transfer to the RAM 103 serving as the data storage area has been ended. That is, the MFP decides whether or not the buffer in the End Point 1 is empty.

In S4050, if the data still remains in the buffer, the MFP 1000 returns a NACK (Negative ACKnowledgment), i.e., a retransmission request, to the PC. Here, the NACK is an example of a NACK response.

In S3030, after elapsing a certain time, the PC 2000 retransmits the Alternate changeover request for changing over the setting of the End Point.

In S4060, the MFP 1000 again decides whether or not the data transfer to the RAM 103 serving as the data storage area has been ended. That is, the MFP again decides whether or not the buffer in the End Point 1 is empty.

In S4070, if there is no data in the buffer, the MFP 1000 returns the ACK to the PC.

In S4080, the MFP 1000 initializes the End Point, and changes over the setting.

Subsequently, the operation of the MFP will be described with reference to FIG. 5.

Figure 5:
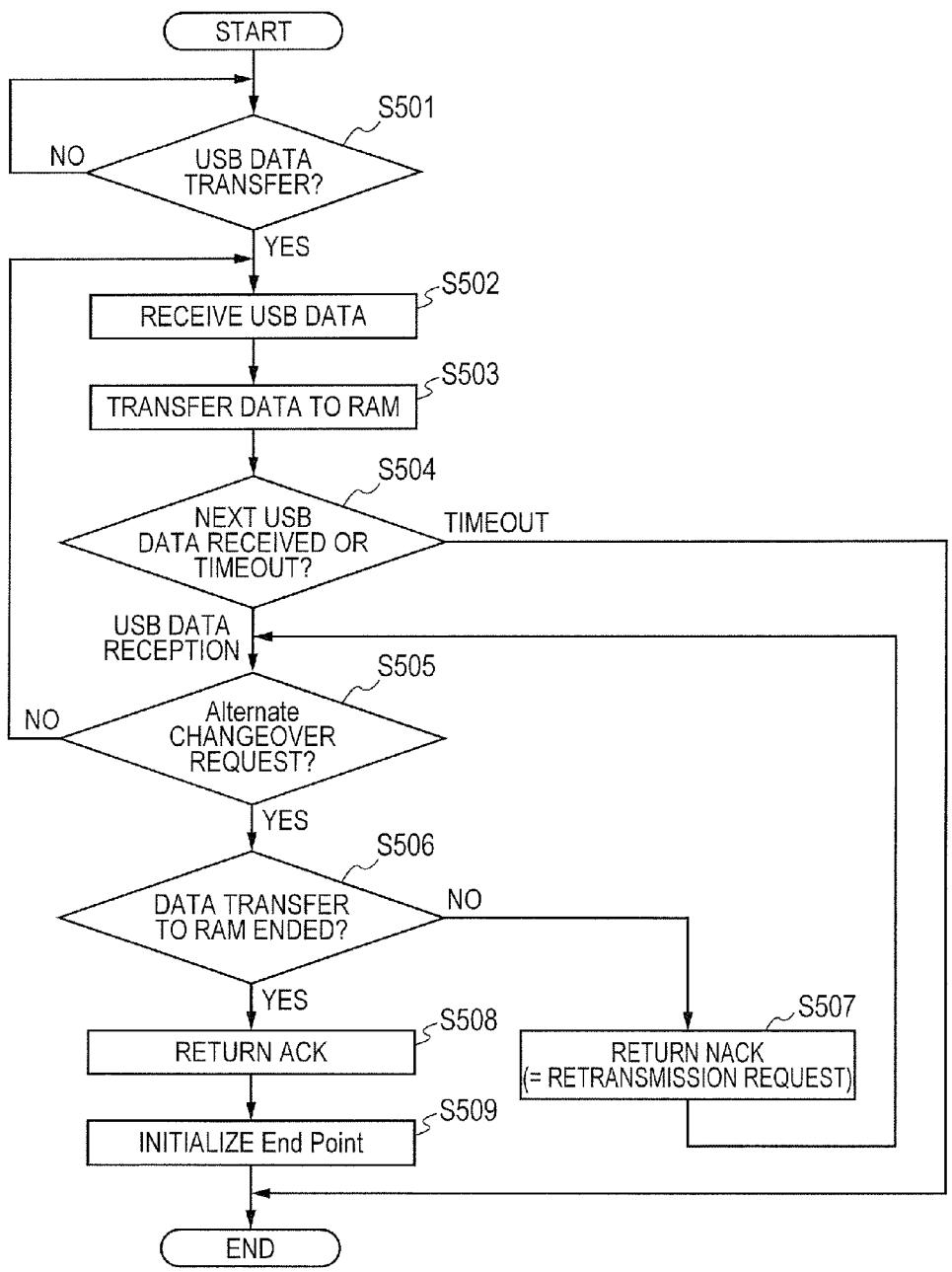
FIG. 5 is a flow chart for describing a response operation to an Alternate changeover request to be performed by the MFP.

That is, FIG. 5 is the flow chart for describing the response operation to the Alternate changeover request to be performed by the MFP 1000.

In S501, the CPU 101 decides whether or not the transfer of the USB data is started. If it is decided by the CPU 101 that the transfer of the USB data is started (YES in S501), the process is advanced to S502. On the other hand, if it is decided that the transfer of the USB data is not started (NO in S501), the process of S501 is repeated.

In S502, the CPU 101 receives the data from the PC 2000 serving as the USB Host, and stores the received data in the buffer of the End Point 1.

Subsequently, in S503, the CPU 101 transfers the data stored in the buffer of the End Point 1 to the RAM 103 serving as the data storage area.

Subsequently, in S504, the CPU 101 decides whether the next USB data is received or timeout occurs. Then, if it is decided by the CPU 101 that the next USB data is received (USB DATA RECEPTION in S504), the process is advanced to S505. On the other hand, if it is decided that the timeout occurs (TIMEOUT in S504), the operation illustrated in FIG. 5 is ended.

In S505, the CPU 101 decides whether or not the received data is the data indicating the Alternate changeover request. If it is decided by the CPU 101 that the received data is the data indicating the Alternate changeover request (YES in S505), the process is advanced to S506. On the other hand, if it is decided that the received data is not the data indicating the Alternate changeover request (NO in S505), the process is returned to S502.

In S506, the CPU 101 decides whether or not the data transfer from the buffer of the End Point 1 to the RAM 103 serving as the data storage area is ended, that is, the CPU decides whether or not the data still remains in the buffer. Then, if it is decided by the CPU 101 that the data transfer is ended (YES in S506), the process is advanced to S508. On the other hand, if it is decided that the data transfer is not ended (NO in S506), the process is advanced to S507.

In S507, the CPU 101 returns the NACK, i.e., the retransmission request, to the PC 2000, and the process is returned to S505. In response to the NACK, the PC 2000 retransmits, after elapsing a certain time, the Alternate changeover request for changing over the setting of the End Point.

On the other hand, in S508, the CPU 101 returns the ACK to the PC 2000.

In S509, the CPU 101 initializes the End Point, and changes over the setting.

As described above, according to the present embodiment, in the case where the Alternate changeover request is received from the PC being the host apparatus, if the data transfer to the internal memory is not yet ended, the following operations are possible. That is, it is possible to return the retransmission request to the PC. Further, by returning the retransmission request, it is possible to perform the response within the response time on the USB. Furthermore, by returning the retransmission request, it is possible to delay the Alternate changeover. Furthermore, by returning the retransmission request, it is possible to delay the Alternate changeover and appropriately end the transfer of the internal memory. Furthermore, by returning the retransmission request, it is possible to prevent that the data is lost in the initialization of the End Point by the Alternate changeover.

Incidentally, in the present embodiment, the CPU 101 transmits the ACK and the NACK according to the USB 2.0 standard.

However, in case of Super Speed according to the USB 3.0 standard, if the CPU 101 uses a response (e.g., NRDY (NotReaDY) corresponding to the relevant standard, it is possible to perform the control same as that in the present embodiment. Here, the reply by the NRDY is an example of an NRDY response.

Other Embodiments

The present invention can also be achieved by a process of supplying the program for achieving one or more functions of the above embodiment to a system or an apparatus via a network or a storage medium and causing one or more processors of the computer of the system or the apparatus to read and execute the supplied program. Besides, the present invention can also be achieved by a circuit (e.g., ASIC (application specific integrated circuit)) of achieving one or more functions.

As described above, according to the embodiments of the present invention, it is possible to prevent that the data is lost even when the changeover of the setting of the buffer is instructed.

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-197339, filed Sep. 26, 2014, which is hereby incorporated by reference herein in its entirety.

What is claimed is:
1. An information processing apparatus comprising:
 a memory;
 a universal serial bus (USB) communicator that communicates with an external apparatus via a USB cable, wherein data received by the USB communicator is stored in an end point of the USB communicator, and the data stored in the end point is transferred to the memory; and a processor that executes programs to:

determine whether or not the data has been stored in the end point when a changeover request indicating to change over setting of the end point is received from the external apparatus by the USB communicator, wherein the data stored in the end point is lost when the setting of the end point is changed over; and transmit a Negative ACKnowledgment (NACK) to the external apparatus via the USB cable, when it is determined that the data has been stored in the end point, wherein, when it is determined that the data has been stored in the end point, the changeover of the setting of the end point based on the changeover request is not performed.

2. The information processing apparatus according to claim 1, wherein the memory includes a RAM (random access memory).

3. The information processing apparatus according to claim 1, wherein
the information processing apparatus is a printing apparatus capable of performing printing, and
the USB communicator receives print data from the external apparatus via the USB cable.

4. The information processing apparatus according to claim 1, wherein
the processor further executes the programs to transmit an ACKnowledgment (ACK) to the external apparatus via the USB cable, when it is determined that the data is not stored in the end point, and
when it is determined that the data is not stored in the end point, the changeover of the setting of the end point based on the changeover request is performed.

5. A controlling method for an information processing apparatus which stores data received by a universal serial bus (USB) communicator for communicating with an external apparatus via a USB cable in an end point of the USB communicator, and further transfers the data stored in the end point to a memory, the controlling method comprising:

receiving a changeover request indicating to change over setting of the end point, from the external apparatus by the USB communicator;

determining whether or not the data has been stored in the end point, when the changeover request is received, wherein the data stored in the end point is lost when the setting of the end point is changed over; and transmitting a Negative ACKnowledgment (NACK) to the external apparatus via the USB cable, when it is determined that the data has been stored in the end point, wherein, when it is determined that the data has been stored in the end point, the changeover of the setting of the end point based on the changeover request is not performed.

6. A non-transitory computer-readable storage medium of storing a program to perform a controlling method for an information processing apparatus which stores data received by a universal serial bus (USB) communicator for communicating with an external apparatus via a USB cable in an end point of the USB communicator, and transfers the data stored in the end point to a memory, the controlling method comprising:

receiving a changeover request indicating to change over setting of the end point, from the external apparatus by the USB communicator;

determining whether or not the data has been stored in the end point, when the changeover request is received, wherein the data stored in the end point is lost when the setting of the end point is changed over; and transmitting a Negative ACKnowledgment (NACK) to the external apparatus via the USB cable, when it is determined that the data has been stored in the end point, wherein, when it is determined that the data has been stored in the end point, the changeover of the setting of the end point based on the changeover request is not performed.

* * * * *